Jan. 27, 1942.  C. L. CHARLES  2,271,387
SWIVEL JOINT
Filed March 18, 1940  2 Sheets-Sheet 1
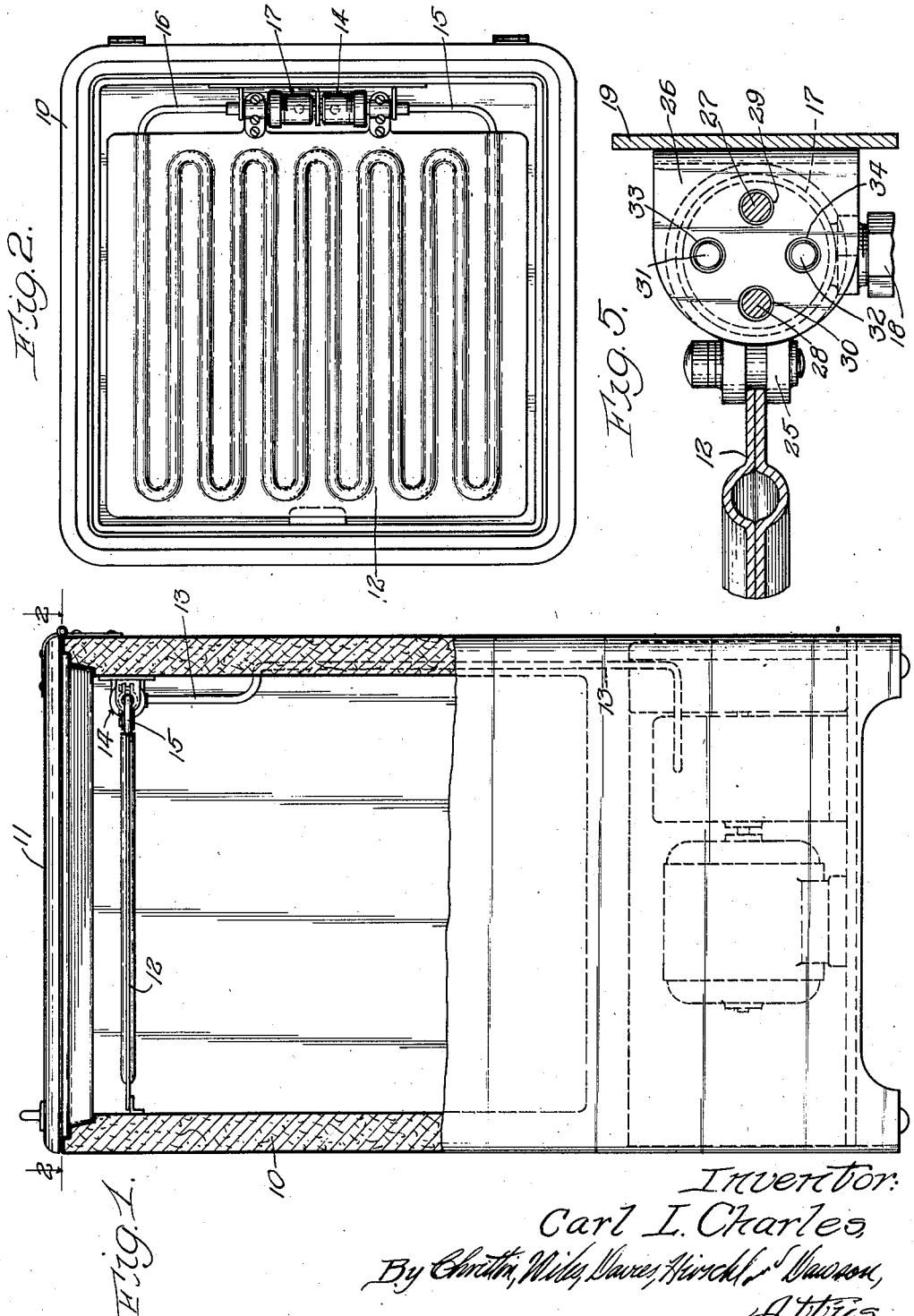
Inventor:
Carl L. Charles,
By Christy, Wiles, Davies, Hirschl & Dawson,
Attys.

Jan. 27, 1942.   C. L. CHARLES   2,271,387
SWIVEL JOINT
Filed March 18, 1940   2 Sheets-Sheet 2
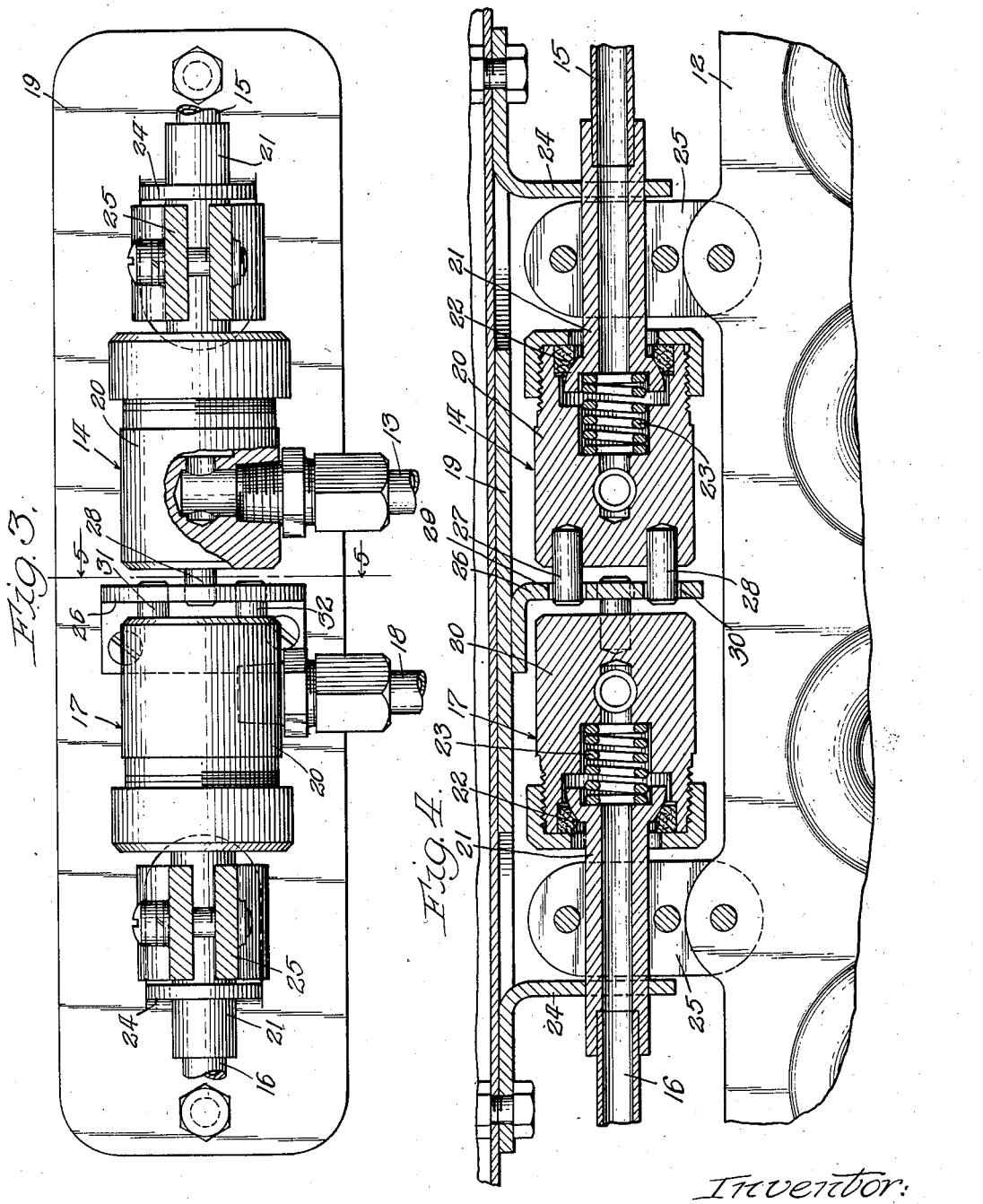

Patented Jan. 27, 1942

2,271,387

UNITED STATES PATENT OFFICE 2,271,387

SWIVEL JOINT

Carl L. Charles, Winnetka, Ill., assignor, by mesne assignments, to Francis N. Bard, Highland Park, Ill.

Application March 18, 1940, Serial No. 324,689

10 Claims. (Cl. 285—9)

This invention relates to a swivel joint, and more particularly to a joint designed to connect a stationary conduit to a pivotally mounted conduit.

One feature of this invention is that it provides improved means for delivering a fluid to or receiving it from an axially rotatable conduit; another feature of this invention is that it provides means for connecting a stationary conduit to a rotatable conduit and eliminating binding or misalignment of the joint elements during rotation of the conduit; a further feature of this invention is that it provides means for restraining one of two joint elements, during rotation of the other, to prevent its rotation while permitting, at least to a limited extent, any other movement thereof necessary to maintain proper alignment between the joint elements; and other features and advantages will be apparent from the following specification and the drawings, in which:

Fig. 1 is a side view, partly broken away, of a top opening refrigerator, a structure to which this improved joint arrangement is particularly adapted; Fig. 2 is a top plan view of the refrigerator shown in Figure 1, with the cover removed; Figure 3 is a detailed vertical view, partly in section, of the joints; Figure 4 is a horizontal sectional view of the joints shown in Figure 3; and Figure 5 is a fragmentary detail view along the line 5—5 of Figure 3.

It is frequently necessary to conduct fluids into or out of a pivotally mounted part. Where the nature of the fluid, or its pressure, is such as to make it impossible to use a flexible conduit of the nature of a rubber tube, it is common to locate the conduit on the rotatable or oscillatable part at the axis about which the part is pivoted, and then to connect it to a conduit on the stationary part by a joint permitting rotation between the parts while maintaining them in sealed relation.

As a commercial manufacturing proposition, however, it is difficult to align the axis of the rotatable conduit with the axis of rotation of the part, so that binding and misalignment between conventional swivel joint parts frequently take place. Moreover, misalignment also has a tendency to cause loss of the fluid passing through the conduit by reducing the efficiency of the seal between the joint elements.

I have overcome these and other difficulties by the joint arrangement disclosed herewith. I arrange the joint elements so that there is relatively free rotational and limited universal movement between them; and I provide means for restraining rotation of the one joint element, upon rotation of the other, which prevents the rotation, while permitting within a limited range any other movement of the joint element necessary to prevent binding between the two elements and the consequent breaking of the seal.

In the particular embodiment of my invention illustrated herewith, 10 indicates a refrigerator cabinet having a food compartment in the upper part thereof and a machinery chamber or compartment in the lower part. In this particular cabinet all four walls of the food chamber are fixed in place, and access is had to it by opening a door 11 at the top of the refrigerator, this door being here shown pivotally mounted at the back of the cabinet. Operative apparatus for compressing a conventional refrigerant and delivering it to an evaporator 12 is of course provided, here being indicated in dotted lines in the machinery compartment.

The evaporator 12 is here shown as of the plate type, comprising a pair of plates welded or otherwise fastened together to provide passages for the evaporation of the refrigerant. As may be best seen in Figure 2, the refrigerant enters the evaporator 12 at one end, and after travelling through a circuitous passage therein, leaves it at the other end to return to the compressor inlet. For reasons of cooling efficiency, it is desirable to mount the evaporator plate just beneath the door or cover 11; yet if access to the contents of the food chamber is to be had, some means must be provided for temporarily swinging the evaporator plate out of the position shown in the drawings. This is accomplished by providing a pivotal mounting for the evaporator near the back of the cabinet, and by making the fluid connections to it through joints which will permit rotation. It will be readily apparent that it is only necessary to swing up the cover 11 and then the evaporator 12 to have access to the contents of the food compartment; and that this access is had without complete loss of the cold air therein. A refrigerator of this type is particularly adapted to maintain its contents at a temperature continuously below the freezing point.

Referring particularly to Figures 1 and 2, it will be seen that refrigerant vapor is sent upwardly from the machinery compartment through a conduit 13, connected to one element of a joint indicated in general as 14. The other element of the joint is connected, as by welding, to a conduit 15 leading to one end of the passageway in the evaporator plate 12. Vapor leaving the evaporator plate travels through a conduit 16 to one element of the joint, here indicated in general as 17, the other element of this joint being connected to a conduit which returns the vapor to the machinery compartment, where it is recompressed. The portions of the conduits 15 and 16 connected to the joint elements are coaxial or concentric with the axis about which the evaporator plate 12 is pivotally mounted for rotation through an arc sufficiently large to permit the desired access to the food chamber. As will be brought out more fully hereafter, the stationary conduits, as the delivery conduit 13 and the return conduit, preferably have limited flexibility. That is, these conduits may be of copper or similar tubing permitting some noticeable flexing, while still not capable of the type of flexure to which a rubber tube can be subjected.

Referring now more particularly to Figures 3, 4 and 5, the two joints 14 and 17 duplicate each other, and therefore the details of construction and operation of only one will be described. Both are mounted on a bracket 19 fastened to the back of the refrigerator cabinet.

Referring now more particularly to the joint 14, the righthand one in Figures 3 and 4, it will be seen to comprise a female or socket element 20 and a ball or male element 21. The socket element 20 has therein an annular gasket 22 serving as a seat against which the ball portion of the other element 21 is sealed by the force of the spring 23, and the pressure of the refrigerant. This construction permits rotation and limited universal movement between the joint elements. Rotation is being used here in a sense intended to include any movement about a definite center, even though only through a limited arc.

An L-shaped member 24 has an opening therethrough in which the joint element 21 is rotatably journalled, this serving as one of the bearings for the desired movement of the evaporator plate 12. A clamp 25 is fastened to the joint element 21 and to the evaporator 12 to maintain these parts in the desired relation, so that there will be little or no mechanical strain upon the conduit 15. The duplication of this arrangement by the other joint provides an axis of rotation for the evaporator substantially coinciding with the axes of the rotatable joint elements.

If the axes of the rotatable joint elements absolutely and precisely coincided with the axis of rotation of the evaporator plate as it is swung up and down there would be no necessity of anything but a conventional swivel joint. Practical considerations of manufacture and use, however, render this impossible; and if the desired movement is to be attained without bending of the joint elements, or loss of the desired seal where they contact each other, some means must be provided to compensate for misalignment.

That is done in the present case by providing some limited universal movement between the joint elements, and even more important, by restraining rotation of one of the joint elements in a way which does not prevent it from shifting about as may be necessary during changes in the angle of the rotatable element during movement of the evaporator. This restraining means is here shown as a plate 26 extending forward between the relatively stationary elements of the two joints, and pins in the joints which cooperate with sockets or openings in this plate. The element 20 has connected thereto in any desired manner a pair of pins 27 and 28. These are a loose fit in sockets or openings 29 and 30, respectively, in the member 26. These pins are so arranged that their axes are substantially parallel to the axis of the rotatable element 21, but offset therefrom. The other joint 17 is similarly provided with a pair of pins 31 and 32 which are a loose fit in openings 33 and 34 in the member 26, as may be best seen in Figure 5.

As the evaporator plate is swung up and down during usage of the refrigerator, the rotatable joint elements, as 21, rotate. Similar rotation of the cooperating joint elements is positively prevented, however, by engagement of the pins, as 27 and 28, with sides or walls of the socket openings 29 and 30. At the same time, the arrangement is such that the socket element 20 is not prevented from twisting to a limited extent in a horizontal or vertical plane or in any plane therebetween (universally), or from moving in a direction dictated by the spring bias to keep the ball portion of the rotatable element 21 properly sealed against the gasket 22, even though the gasket and/or ball portion wears away somewhat. The delivery and return tubes 13 and 18 have sufficient flexibility to permit this desired aligning movement of the socket elements; yet the operation of the restraining means is such that these relatively stationary conduits are not called upon to take the strain of preventing rotation of the socket elements upon rotation of the other elements.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described, including: a pair of joint elements rotatably sealed together; and restraining means preventing rotation of one of the elements while providing, at least to a limited extent, for any other movement thereof.

2. Apparatus of the character described for connecting a conduit to another conduit, the latter being rotatable, including: a pair of joint elements rotatably sealed together, one element being connected to each conduit; and restraining means movably connected to one of the elements to prevent rotation while providing, at least to a limited extent, for any other movement thereof.

3. Apparatus of the character claimed in claim 2, wherein the restraining means comprises a pair of members making lost motion connection with each other.

4. Apparatus of the character described for connecting a conduit to another conduit, the latter being rotatable, including: a pair of joint elements rotatably sealed together, one element being connected to each conduit; and restraining means movably connected to one of the elements to prevent rotation while providing, at least to a limited extent, for any other movement thereof, the restraining means comprising a pin and a socket in which it makes a loose fit.

5. Apparatus of the character claimed in claim 4, wherein the axis of the pin is parallel to the axis of the joint element connected to the rotatable conduit and offset with respect thereto.

6. Apparatus of the character claimed in claim 2, wherein the conduit connected to the restrained joint element has limited flexibility.

7. Apparatus of the character described for providing a fluid connection between a stationary part and a second part mounted for pivotal movement, including: a conduit connected to the second part to be movable therewith, this conduit having a portion concentric with the axis of pivotal movement of the part; a second conduit connected to the stationary part, this conduit having limited flexibility; a pair of joint elements rotatably sealed together, one element being connected to each conduit; and restraining means comprising a member secured to the stationary part and a member secured to the joint element connected to the second conduit, the members making lost motion connection with each other, whereby the restraining means prevents rotation of the last mentioned joint element while providing, at least to a limited extent, for any other movement thereof.

8. Apparatus of the character described for connecting a pair of substantially coaxial simultaneously rotatable conduits to a pair of stationary conduits having limited flexibility, including: two joints, each comprising a pair of elements rotatably sealed together, one element of each joint being connected to a rotatable conduit and the other to a stationary conduit; and restraining means preventing rotation of the joint elements connected to the stationary conduits while providing, at least to a limited extent, for any other movement thereof, the restraining means comprising a member on each of the restrained joint elements and a stationary member with which they make lost motion connection.

9. Apparatus of the character claimed in claim 7, wherein the restraining means comprises a pin on the restrained joint element substantially parallel to and offset from the axis of the rotatable element and means secured to the stationary part having a socket in which the pin makes a loose fit.

10. Apparatus of the character claimed in claim 8, wherein the elements of each of the joints are capable of limited universal movement with respect to each other.

CARL L. CHARLES.